United States Patent
Baum et al.

(10) Patent No.: US 6,251,993 B1
(45) Date of Patent: Jun. 26, 2001

(54) ROOM TEMPERATURE CURABLE HYBRID SILICONES

(75) Inventors: Kurt Baum, Pasadena; Wen-Huey Lin, Laguna Niguel, both of CA (US)

(73) Assignee: Fluorochem, Inc., Azusa, CA (US)

( * ) Notice: Subject to any disclaimer, the term of this patent is extended or adjusted under 35 U.S.C. 154(b) by 0 days.

(21) Appl. No.: 09/363,915

(22) Filed: Jul. 28, 1999

(51) Int. Cl.⁷ .................................................. C08F 8/00
(52) U.S. Cl. ..................... 525/100; 525/479; 427/387; 528/15; 528/19; 528/31
(58) Field of Search .................................. 525/100, 479; 427/387; 528/15, 19, 31

(56) References Cited

U.S. PATENT DOCUMENTS

| | | |
|---|---|---|
| 3,928,490 | 12/1975 | Hergenrother . |
| 4,620,048 | 10/1986 | VerStrate et al. . |
| 4,769,417 | 9/1988 | Eichenauer et al. . |
| 4,808,667 | 2/1989 | Goko et al. . |
| 4,895,885 | 1/1990 | Foster et al. . |
| 4,910,252 | 3/1990 | Yonehara et al. . |
| 5,188,750 | * 2/1993 | Kogure et al. . |
| 5,618,875 | * 4/1997 | Baker et al. . |
| 5,703,163 | 12/1997 | Baum . |
| 5,811,193 | 9/1998 | Baum . |

* cited by examiner

Primary Examiner—Robert Dawson
Assistant Examiner—Kuo-Liang Peng
(74) Attorney, Agent, or Firm—Joseph E. Mueth

(57) ABSTRACT

A novel moisture curable polymer combination comprising, a member selected from the group consisting of a polydiolefin polymer containing olefinic unsaturation in either the main polymer backbone or in pendent side chains; and a loop polymer having a polymeric backbone and a plurality of olefinic groups which have been converted to closed loops by reaction with difunctional organic compounds reactive with said olefinic groups, said olefinic groups from which the loops are formed may either be present within the backbone and/or pendent from the polymeric backbone; and a silicon cross-linking compound containing at least one easily hydrolyzed substituent.

6 Claims, No Drawings

ROOM TEMPERATURE CURABLE HYBRID SILICONES

The work embodied in this patent was carried out under Contracts N00014-91-C-0007 and N00014-99-C-0049 (Office of Naval Research), giving the Government rights to a royalty-free license.

BACKGROUND OF THE INVENTION

Silicones have become important commercial polymers because of a combination of properties, including high thermal stability, Noll, W., "Chemistry and Technology of Silicones", Academic Press, New York, N.Y., 1968, 388; low surface tension, Voronkov et al, "The Siloxane Bond", Consultants Bureau, New York, N.Y., 1978; low glass transition temperature, optical transparency, Lewis, F. M. in "High Polymers", Vol. XXIII Pt. 2, Kennedy, J. P. and Tornquist, E. G. M., eds, Ch.8, Interscience, New York, N.Y., 1969; and low dielectric constant. These materials, however, have relatively poor mechanical strength, Polmanteer, K. E. J. Elastoplastics, 1970, 2, 165 and Yilgor, I. et al, Adv. Polym. Sci.1988, 86, 1–86; generally requiring high filler loading to obtain acceptable properties. The poor strength is usually attributed to flaws or microcracks that grow readily because of the high mobility of the chains, Smith, T. L., Rubber Chem. Technol. 1978, 51, 225.

An alternative approach to the preparation of silicones with improved mechanical strength has been to attach difunctional silanes, such as hydride-terminated polydimethylsiloxanes, to high molecular weight polyolefins, such as polybutadiene, by hydrosilylation. To prevent premature crosslinking and gelation, the reactions were carried out in dilute solution. Under these conditions, after one end of a polysiloxane chain attaches to an olefin site, the other end tends to attach to a nearby olefin site on the same polybutadiene molecule forming a silicone side-loop on a hydrocarbon backbone. The side-loops provide the desirable surface properties of silicones, and the hydrocarbon backbone contributes to mechanical strength. This technology have been described in Baum, K., U.S. Pat. No. 5,703,163; Baum, K., U.S. Pat. No. 5,811,193 and Baum, K. et al, J. Am. Chem. Soc. 1998, 120, 2993–2996. This reaction is depicted in the following scheme.

Scheme 1
Side-loop formation.

HSiMe$_2$—(OSiMe$_2$)$_n$—OSiMe$_2$H +

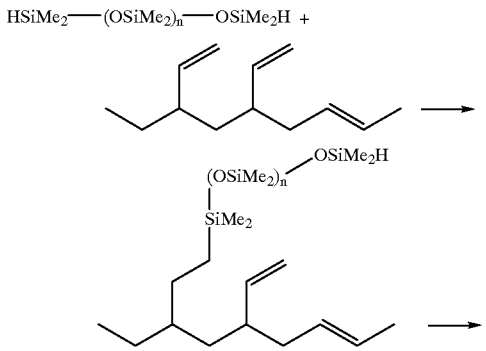

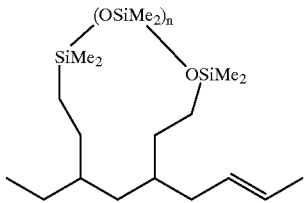

The loop polymers have been used in the preparation of coatings. The dilute hydrolylation solution was concentrated, and the concentrate was applied to a surface. Small amounts of unreacted hydrido groups then reacted with olefinic groups to give crosslinked coatings. However, reaction temperatures of 50–150° C. were generally required to provide desirable cure rates. While these elevated temperature conditions are acceptable for many coating applications, they are not practical for other applications, such as ship hull coatings.

This invention relates to novel room temperature curable coatings. The room temperature curable coatings of this invention are particularly useful as ship hull coatings.

SUMMARY OF THE INVENTION

Briefly, this invention comprises novel moisture curable polymer composition comprising, in combination, a member selected from the group consisting of a polydiolefin polymer containing olefinic unsaturation in either the main polymer backbone or in pendent side chains and a loop polymer having a polymeric backbone and a plurality of olefinic groups which have been converted to closed loops by reaction with difunctional organic compounds reactive with said olefinic groups, said olefinic groups from which the loops are formed may either be present within the backbone and/or pendent from the polymeric backbone; and a silicon cross-linking compound containing at least one easily hydrolyzed substituent and at least one hydride substituent.

The invention further comprises exposing the above-described combinations of polymer and crosslinker to moisture to cross link, preferably at or around room temperature.

Still further the invention includes a substrate, usually steel or other metal, coated with the above-described combinations of polymer and cross linker, and cross linked by exposure to atmospheric moisture to form an adherent protective coating.

The polydiolefin polymers may be polybutadiene, polyisoprene, polychloroprene and the like.

The loop polymers are generally prepared by reacting a polyunsaturated material, such as polybutadiene, with a dihydrido silicon compound, such as hydride terminated polydimethyl-siloxane, in an inert solvent, such as toluene, in the presence of a hydrosilylation catalyst. The completion of the hydrosilylation reaction can be observed by the loss of silicon hydride absorption in the infrared spectrum.

The loop polymers may also have hydroxy or carboxy groups which can be capped with diisocyanates or epoxies, respectively.

The polydiolefins and the loop polymers may have molecular weights on the order of 1000 or 100,000 or more.

The present invention provides coatings in which hydrolytic type cures take place at or around room temperature, although temperatures of from about 0° F. to 100° F. are contemplated.

The cross-linking agents are silicon compounds with easily hydrolyzed substituents, such as halogens, alkoxy groups or acyloxy groups. When coatings containing these materials are exposed to the atmosphere, atmospheric moisture causes hydrolysis, forming silanol groups that are converted to siloxanes cross-links. Catalysts such as tin compounds are frequently used.

The cross-linking according to this invention can be general illustrated by the following reactions:

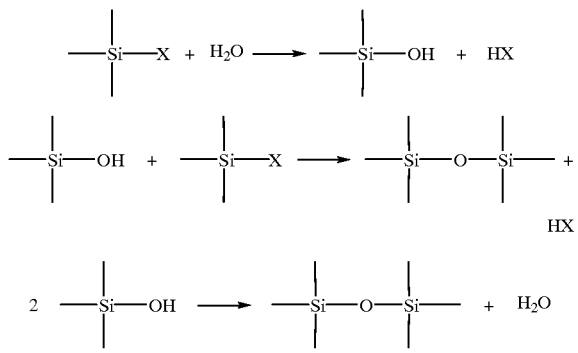

Cross linking agents contain one or more silicon atoms, with one or more easily hydrolyzable groups on silicon, and one or more hydrido functions on silicon. The hydrolyzable groups can be, but are not limited to, alkoxy groups, halogens or acyloxy groups.

The cross-linking agents are typically comprise from 1 to 100 mole % of the olefinic double bonds present in the polydiolefin or loop polymers.

These cross linking agents in one preferred class, can be depicted as follows:

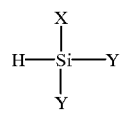

wherein X is a hydrolyzable group such as chloro, alkoxy or acyloxy, and Y may be either aryl, alkyl or one of said hydrolyzable groups. The aryl and alkyl groups may be substituted or unsubstituted. Suitable substituents include halogens, alkyls, etc. The y groups can be the same or different from each other.

The aforementioned alkoxy, acyloxy, aryl and alkyl groups typically contain from 1 to about 20 carbon atoms.

Dimethylethoxysilane and dimethylchlorosilane are readily available compounds that meet these criteria, and are preferred cross linking agents. When loop polymers are used, the cross linking agent can be added to the hydrosilylation mixture after the loop formation is complete, although the point at which it is added is not critical. The cross linking agent adds to double bonds of the polybutadiene or other polydiolefin by hydrosilylation. Variation of the amount of the cross linking agent will vary the physical properties of the finished product.

After the hydrosilylation is complete, solvent may be removed to give a material with a concentration and viscosity suitable for application as a coating. Optionally, other components and catalysts may be added to vary the properties of coatings. For example, tetraethyl orthosilicate may be added to increase the cross-link density, and alkoxy terminated polydimethylsiloxane, to increase toughness.

When the invention is practiced using polydiolefins, the above-described cross linking agents, for example dimethylethoxysilane, are reacted directly with polybutadiene or other polydiolefin, omitting the step in which a difunctional hydrosilane is used to form side-loops.

In a further preferred embodiment of the invention, when a polydiolefin without side loops is used, an additional polymeric component can be used. The additional polymeric component is a polysiloxane terminated with hydrolyzable groups, such as ethoxy or chloro terminated polydimethylsiloxane. The poly siloxane terminated with hydrolyzable groups is essentially free of Si—H groups. The additional polymeric compound is added before or after enough solvent is removed to give a concentration suitable for application as a coating. After the material is applied to a substrate, co-hydrolysis of the two types of ethoxysilanes can give coatings with similar overall composition as those obtained using the side-loop method, but possibly with fewer loops and more silicone bridges between hydrocarbon chains.

The texts of the above-cited U.S. Pat. Nos. 5,703,163, and 5,811,193 are expressly incorporated herein by reference.

DESCRIPTION OF PREFERRED EMBODIMENTS

The following Examples are presented to illustrate the invention.

EXAMPLES

Materials

Toluene was dried over molecular sieves (3A, 4–8 mesh). Polybutadiene (Mn 100,000, 93% vinyl olefin) was used as received from Scientific Polymer Products, Inc. Hydride-terminated poly(dimethylsiloxane) (Mn 400), ethoxy-terminated poly(dimethylsiloxane) (Mn 360–450), and dimethylethoxysilane were obtained from United Chemical Technologies, Inc. Wilkinson's catalyst, tris (triphenylphosphine)rhodium(I) chloride, was purchased from Aldrich Chemical Co. FTIR spectra were recorded using a Perkin Elmer model 1605 spectrometer.

Example I

Side-loop Polymer Solution: PDMS-PBD-DMES

Hydride-terminated poly(dimethylsiloxane), (PDMS), and Wilkinson's catalyst tris(triphenylphosphine)rhodium(I) chloride were added to a solution of polybutadiene (PBD) in toluene at 50–60° C. under nitrogen. The mixture was refluxed under nitrogen until IR analysis of aliquots indicated the absence of Si—H absorption at 2125 and 909 cm$^{-1}$. The solution was cooled to 50–60° C., and dimethylethoxysilane (DMES) and additional catalyst were added. The solution was stirred at 105° C. until the infrared Si—H absorption at 2110 and 909 cm$^{-1}$ had disappeared. Examples

TABLE 1

Hydrosilylation of PBD with PDMS and DMES[a]

| | Step 1 | | | | | | Step 2 | | |
|---|---|---|---|---|---|---|---|---|---|
| | PDMS[c] | | PBD[d] | | Cat[a] | Time[f] | DMES | Cat[a] | Time[f] |
| Adduct[b] | wt(g) | eq SiH | wt(g) | eq vinyl | wt(mg) | hr | wt(g) | eq SiH | wt(mg) | hr |
| H1V2D0.1 | 6.32 | 0.0316 | 3.68 | 0.0632 | 25 | 90 | 0.33 | 0.0032 | 3.5 | 68 |
| H1V3D0.5 | 5.35 | 0.0268 | 4.67 | 0.0802 | 21 | 25 | 1.39 | 0.0133 | 4.7 | 112 |
| H1V5D0.8 | 4.08 | 0.0204 | 5.93 | 0.1019 | 17 | 22 | 1.77 | 0.0170 | 5.0 | 93 |

[a]1500 mL of toluene as solvent.
[b]H1V2D0.1 designates 1:2:0.1 PDMS—PBD—DMES.
[c]eq wt 200.
[d]93% vinyl content.
[e]Wilkinson's catalyst.
[f]at refluxing temperature.
[g]at 105° C.

Example II
Polybutadiene Dimethylethoxysilane Adduct Solution: DMES-PBD

Dimethylethoxysilane and Wilkinson's catalyst tris(triphenylphosphine)rhodium(I) chloride were added to a solution of polybutadiene in toluene at 50–60° C. under nitrogen. The mixture was stirred at 105° C. under nitrogen until IR analysis of aliquots indicated the absence of Si-H absorption at 2110 and 909 $cm^{-1}$.

TABLE 2

Hydrosilylation of PBD with DMES[a]

| | DMES | | PBD[b] | | Cat[c] | Time[d] |
|---|---|---|---|---|---|---|
| Adduct | wt(g) | eq SiH | wt(g) | eq vinyl | wt(mg) | hr |
| 1:2DMES—PBD | 4.73 | 0.0454 | 5.27 | 0.0906 | 23 | 113 |
| 1:3DMES—PBD | 3.73 | 0.0358 | 6.25 | 0.1075 | 18 | 41 |
| 1:5DMES—PBD | 2.64 | 0.0253 | 7.36 | 0.1265 | 14 | 46 |

[a]300 mL of toluene as solvent.
[b]93% vinyl content.
[c]Wilkinson's catalyst.
[d]at 10° C.

Example III

Preparation of Coating Solutions

Formulations were prepared as shown in Table 3. An appropriate aliquot of the PDMS-PBD-DMES solution was concentrated in vacuo to leave a 45–50 wt % polymer solution. Dimethylethoxy-terminated PDMS and a solution of dibutyltin diacetate catalyst were added. The mixture was reconcentrated to approximately 45 wt % PDMS-PBD-DMES. Trifluoroacetic acid catalyst was then added and the solution was applied to the substrate immediately.

For DMES-PBD, an aliquot of the toluene solution was concentrated in vacuo to a 25–30 wt %. After dimethylethoxy terminated PDMS and the tin catalyst solution were added, the solution was reconcentrated to about 25 wt % DMES-PBD. Trifluoroacetic acid was diluted with a small amount of toluene and added. The solution was used immediately.

TABLE 3

Weight % of individual ingredient per total wt of all ingredients.

| | Polymer | side loops | PDMS—PDB—DMES or DMES—PDB[a] | EtO—PDMS[b] | DBTDA[c] | TFA[d] | total PDMS |
|---|---|---|---|---|---|---|---|
| 1 | 1:2:0.1 PDMS—PBD—DMES | y | 96.81 | 1.69 | 0.47 | 0.94 | 64.17 |
| 2 | 1:3:0.5 PDMS—PBD—DMES | y | 93.29 | 5.40 | 0.41 | 0.82 | 60.55 |
| 3 | 1:5:0.84 PDMS—PBD—DMES | y | 82.49 | 16.67 | 0.42 | 0.35 | 57.63 |
| 4 | 1:2 DMES—PBD | n | 57.74 | 41.92 | 0.29 | 0 | 69.17 |
| 5 | 1:3 DMES—PBD | n | 63.37 | 36.25 | 0.32 | 0 | 59.95 |
| 6 | 1:5 DMES—PBD | n | 70.82 | 28.75 | 0.35 | 0 | 47.45 |
| 7 | 1:2 DMES—PBD | n | 57.47 | 41.72 | 0.29 | 0.51 | 68.90 |
| 8 | 1:3 DMES—PBD | n | 63.13 | 36.11 | 0.32 | 0.42 | 59.72 |
| 9 | 1:5 DMES—PBD | n | 70.52 | 28.63 | 0.35 | 0.49 | 47.25 |

[a]PDMS—PBD—DMES for items 1–3, DMES—PBD for items 4–9.
[b]Dimethylethoxy terminated PDMS.
[c]Dibutyltin diacetate added as a 2.5% solution in toluene.
[d]trifluoroacetic acid.

The rigidity of the samples listed in Table 3 upon curing is related to the degree of crosslinking, which is related to the amount of DMES in the formulation.

Example IV

Storage life of 1:3 DMES-PBD with and without ethoxy-terminated PDMS or dibutyltin diacetate was investigated. The results indicated that the presence of ethoxy-terminated PDMS had only a small effect on the storability of the solution, but storage life was shortened more significantly by adding dibutyltin diacetate. The crosslinking reaction is accelerated by trifluoroacetic acid. These components can be combined just prior to use as a 2-part system. A 40% solution of 1:3:0.5 PDMS-PBD-DMES can be stored for more than 3 months. A two-part RTV system can include DMES-PBD (25–30 wt %) or PDMS-PBD-DMES (45–50 wt %) in toluene as part A and a mixture of ethoxy-terminated PDMS, dibutyltin diacetate, and trifluoroacetic acid as part B. An alternative is to exclude ethoxy-terminated PDMS from part B and add it into part A for storage. When parts A and B were mixed after storage for 3 weeks, clear, strong films were obtained when ethoxy-terminated PDMS was included in part A, but weak hazy films were obtained when this component was included in part B.

TABLE 4

Storage life.

| | Formulation | Storage life (days) |
|---|---|---|
| 1 | 27.65% 1:3 DMES-PBD<br>72.35% Toluene | >90 |
| 2 | 27.09% 1:3 DMES-PBD<br>12.71% Ethoxy-terminated PDMS<br>60.20% Toluene | >60 |
| 3 | 28.79% 1:3 DMES-PBD<br>13.61% Ethoxy-terminated PDMS<br>0.11% Dibutyltin diacetate<br>57.49% Toluene | 20 |

Cure and Properties

Cure was effected by exposure to atmospheric moisture at room temperature. The cure rate depends upon the humidity of atmosphere and the thickness of the coating. Optionally, acidic cocatalysts may be used. For example, tack-free time was dramatically reduced by the use of trifluoroacetic acid. After mixing with the acid, the sample must be used immediately.

The films cast from these silicone compositions when cured are very strong, and optically clear. Coating substrates may be plastics, metals or glass, and good adhesion was obtained without the use of primers.

What is claimed is:

1. A moisture curable polymer composition comprising,
   (a) a loop polymer having a polymeric backbone including a plurality of olefinic groups which have been converted to closed loops by reaction with difunctional organic compounds reactive with said olefinic groups, said olefinic groups from which the loops are formed may either be present within the backbone and/or pendent from the polymeric backbone; and
   (b) a silicon cross-linking compound containing at least one easily hydrolyzed substituent and at least one hydride substituent.

2. The composition of claim 1 wherein the polymeric backbone is polybutadiene.

3. The composition of claim 1 additionally containing a polysiloxane terminated with hydroxyl groups.

4. The composition of claim 1 wherein the silicon cross linking compound has the general formula,

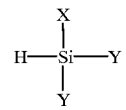

wherein X is a hydrolyzable group and Y may be either substituted or unsubstituted alkyl, substituted or unsubstituted aryl or a hydrolyzable group.

5. The composition of claim 4 wherein the hydrolyzable group is chloro, alkoxy or acyloxy.

6. The composition of claim 1 which is curable at about room temperature.

* * * * *